United States Patent [19]
MacMillan

[11] 3,847,631
[45] Nov. 12, 1974

[54] APPARATUS FOR AND METHOD OF RETREADING TIRES

[75] Inventor: Kenneth T. MacMillan, Macon, Ga.

[73] Assignee: MacMillan Mold Company, Inc., Macon, Ga.

[22] Filed: Feb. 9, 1973

[21] Appl. No.: 331,183

Related U.S. Application Data

[63] Continuation of Ser. No. 81,342, Oct. 16, 1970, abandoned.

[52] U.S. Cl............ 156/96, 156/394 FM, 264/314, 425/23, 425/25, 425/32, 425/43, 425/47 264/315,
[51] Int. Cl.......................... B29h 5/04, B29h 17/36
[58] Field of Search......... 156/95, 96, 394, 394 FM; 264/314, 315; 425/23, 47

[56] References Cited
UNITED STATES PATENTS

| | | | |
|---|---|---|---|
| 2,933,765 | 4/1960 | Richardson | 425/23 |
| 2,228,211 | 1/1941 | Heintz | 156/96 |
| 2,975,476 | 3/1961 | Burke | 264/315 |
| 2,984,281 | 5/1961 | Kraus | 156/96 X |
| 3,198,679 | 8/1965 | Iknayan et al. | 156/96 |
| 3,489,833 | 1/1970 | Lehnen | 264/315 |
| 3,579,626 | 5/1971 | Brittain | 264/315 |

FOREIGN PATENTS OR APPLICATIONS

| 634,953 | 1/1962 | Canada | 156/394 |
|---|---|---|---|

Primary Examiner—Clifton B. Cosby
Attorney, Agent, or Firm—Diller, Brown, Ramik & Wight

[57] ABSTRACT

This disclosure relates to an apparatus for and a method of retreading or recapping tires by inserting a tire into a generally annular chamber of a matrix, positioning an annular back-up member in internal telescopic relationship to the tire, positioning an annular flexible bladder in the tire and in external telescopic relationship to the back-up member, heating a noncompressible, nonexpandable, noncombustible liquid above ambient temperature (preferably approximately 300°F.) and circulating the heated liquid through the bladder under high pressure (preferably between 200-600 psi.) whereby the bladder is expanded to force the tire into intimate contact with the chamber and effect the curing thereof through the heated-pressurized liquid.

21 Claims, 7 Drawing Figures

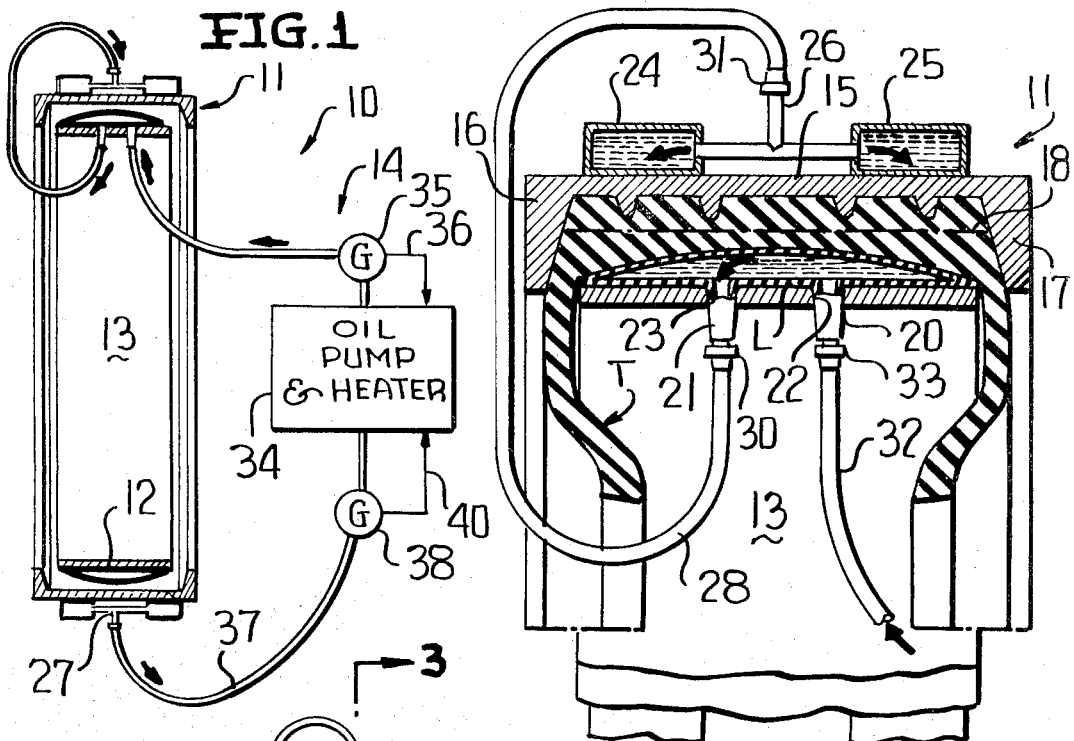
FIG. 1
FIG. 3
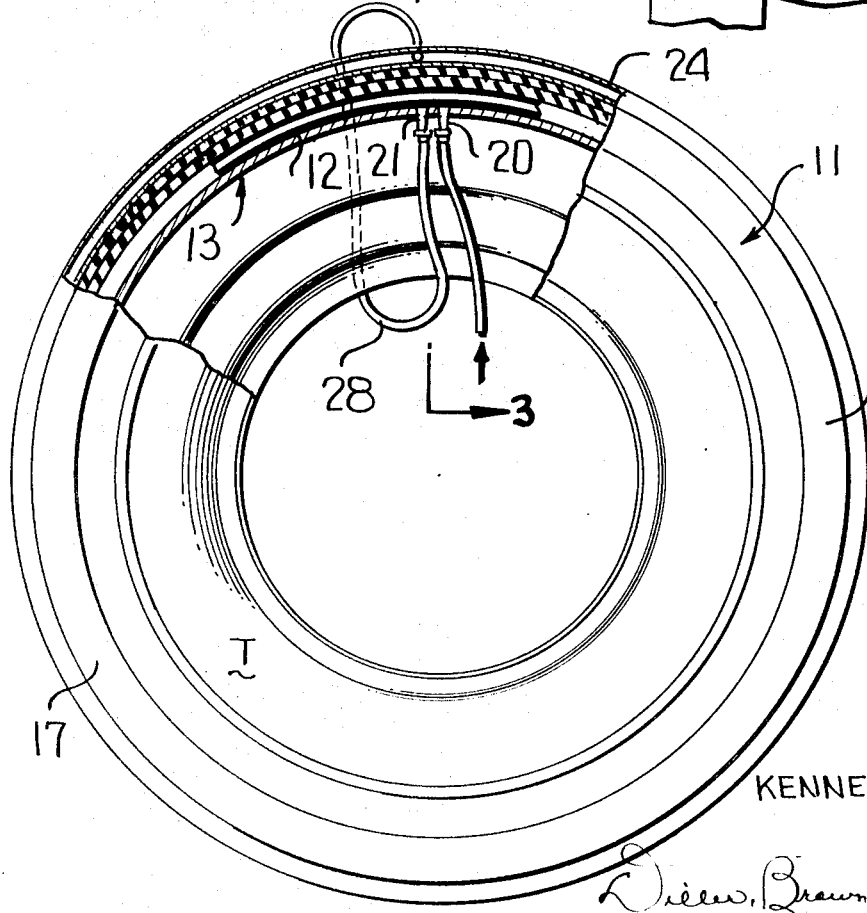
FIG. 2
INVENTOR
KENNETH T. MacMILLAN
ATTORNEYS INVENTOR
KENNETH T. MacMILLAN

ATTORNEYS

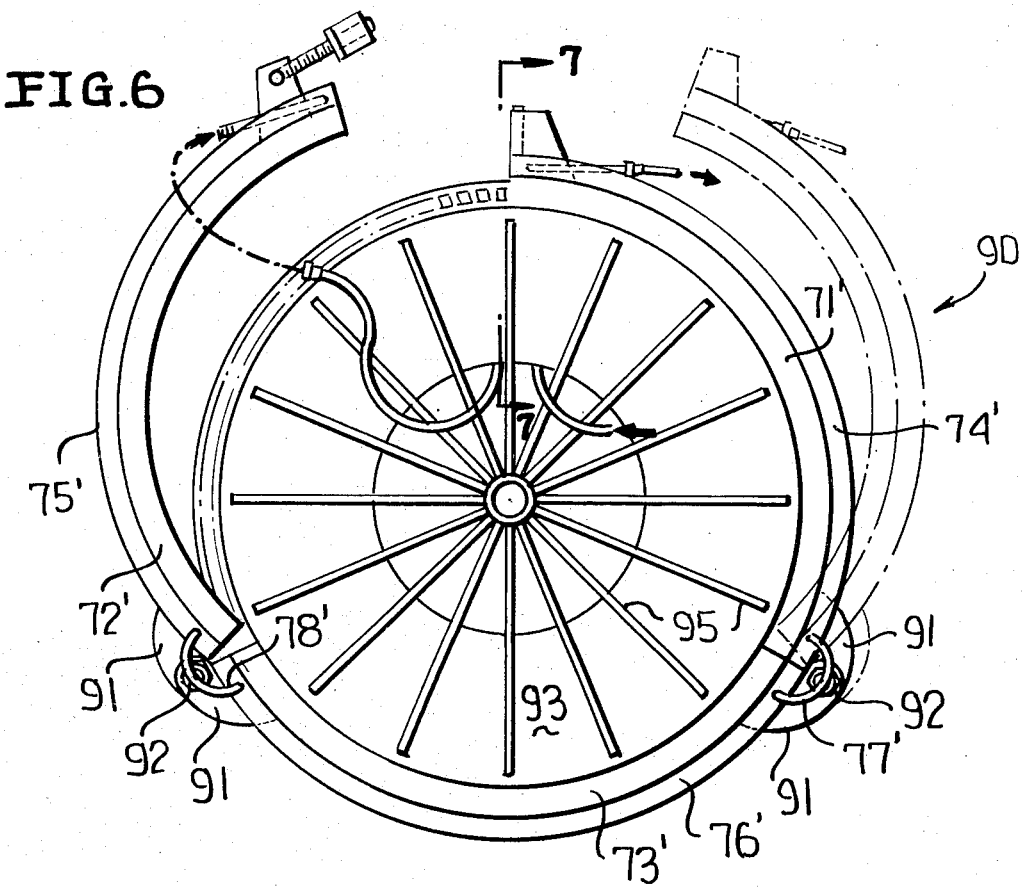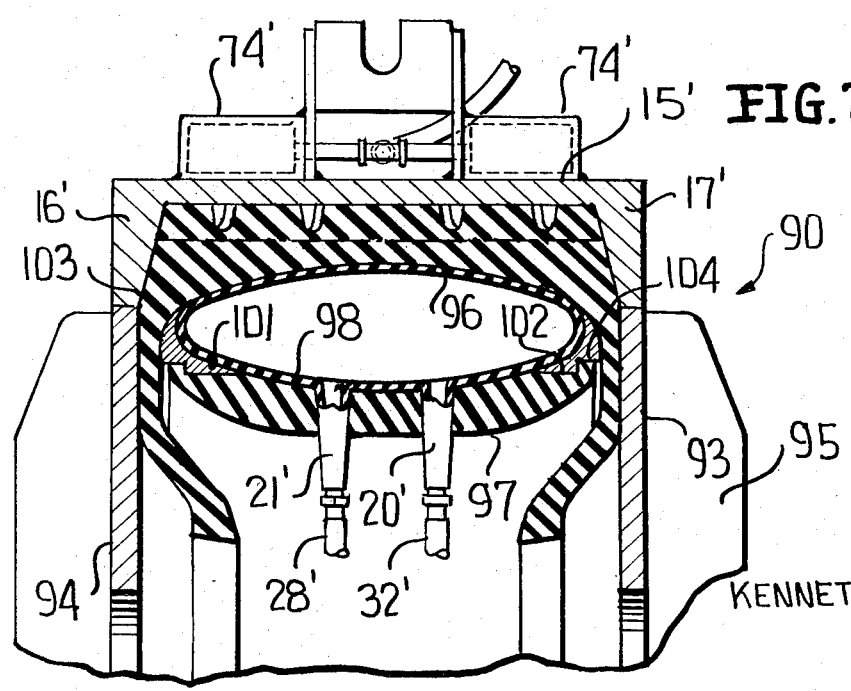

APPARATUS FOR AND METHOD OF RETREADING TIRES

This a continuation of application Ser. No. 81,342, filed Oct. 16, 1970 now abandoned.

The present invention is directed to an apparatus for curing retreaded or recapped vehicle tires by employing noncompressible, nonexpandable and noncombustible liquid which is introduced under high pressure into a generally annular tube or bladder with the tire to be recapped positioned between the bladder and an associated matrix chamber. The bladder is part of a closed liquid circuit which includes a high pressure pump for pressurizing the liquid, the closed liquid circuit being provided to assure rapid recirculation of the liquid through the bladder thereby providing excellent temperature control. Moreover, because the tread is applied under extremely high pressure it will become extremely dense which will substantially increase tread mileage. The non-expandable and noncompressible nature of the liquid will also provide an intimate positive bond between the new tread and the tire body. Moreover, since the heated liquid is continually circulated, not only is temperature control assured, but curing time over conventional apparatuses is substantially reduced since the tire is heated from the inside, as well as from the outside, resulting in curing times for conventional tires of approximately one-half hour and for some large truck tires curing is achieved in half the time of known methods.

Preferably, the apparatus includes as part of the closed liquid circuit a high pressure pump for pressurizing the liquid, but in the event of any leakage and/or rupture in the liquid circuit, including the expansible bladder, means are provided for discontinuing the operation of the pump which, of course, is an added safeguard beyond that of employing a noncombustible liquid.

In keeping with another object of this invention, the matrix itself is heated by hollow manifolds or coils surrounding the exterior thereof and forming a portion of the closed liquid circuit whereby a tire which is being cured is heated both internally (through the bladder) and externally (through the coils).

Another object of this invention is to provide a novel apparatus of the type heretofore set forth wherein the matrix is formed of a plurality of sections to facilitate the insertion and removal of the tire, and also to permit the use of shims between opposed faces of adjacent sections to accommodate variations in tires of the same size.

Still the bladder object of this invention is to provide a novel apparatus of the type heretofore set forth wherein the back-up member is provided with a seal to prevent leakage should the bladder leak and/or burst, and if found necessary or desirable, the matrix may also be bounded by pairs of pressure plates to assure the confinement of internal pressure within the tire interior and to prevent damage should the bladder burst.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a highly diagrammatic view of an apparatus for retreading tires in accordance with this invention, and illustrates a flexible curing tube or bladder of an annular configuration positioned between a matrix and an internal back-up member, with the bladder being a part of a closed liquid circuit.

FIG. 2 is a side elevational view of a portion of the apparatus with parts thereof broken away and removed for clarity, and illustrates flexible conduits connecting the curing tube with exterior manifolds or coils surrounding the matrix.

FIG. 3 is an enlarged fragmentary sectional view taken generally along line 3—3 of FIG. 2, and clearly illustrates the manner in which the curing tube is expanded by pressurized noncompressible, nonexpandable, noncombustible liquid to urge the exterior surface of the tread against and into intimate contact with the matrix cavity.

FIG. 6 is a side elevational view of another apparatus similar to the apparatus of FIG. 5, but illustrates the three matrix sections being hingedly connected to each other, and one of a pair of annular side pressure plates.

FIG. 7 is an enlarged fragmentary sectional view taken generally along line 7—7 of FIG. 6, and more clearly illustrates the components of the apparatus including both of the side pressure plates and seals carried by a back-up member along with a higher capacity (volumewise) curing tube than that of the apparatuses of FIGS. 1 through 5.

Figure 4:
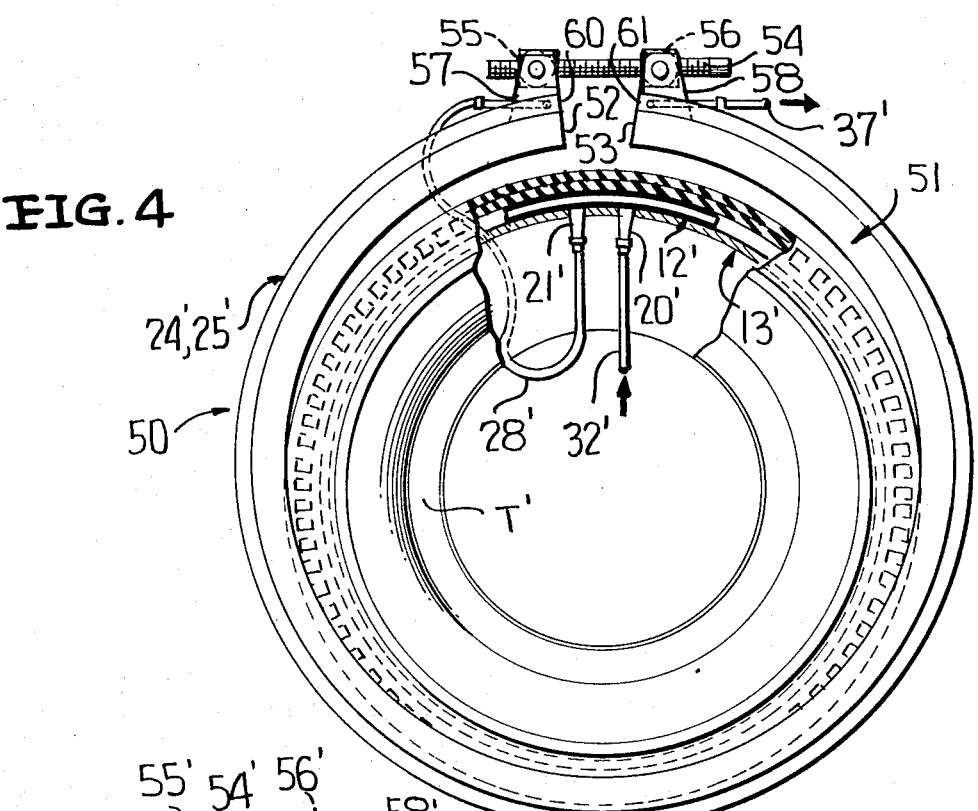
FIG. 4 is a fragmentary side elevational view of another apparatus of this invention with a portion thereof broken away and removed for clarity, and illustrates a matrix which is opened and closed by a left and right-hand threaded trunnion bolt for facilitating the introduction and removal of a tire relative to the matrix.

A novel apparatus constructed in accordance with this invention is generally designated by the reference numeral 10 and includes as components thereof a matrix or mold 11, a flexible annular curing tube or bladder 12, an annular back-up member 13, and a closed liquid circuit or system 14.

The matrix 11 (FIGS. 2 and 3) is constructed from metallic material as a complete annular ring defined by a circumferential wall 15 and a pair of radially inwardly directed peripheral walls 16, 17. The walls 15 through 17 of the matrix 11 define a generally annular internal cavity or chamber 18 which receives at least the tread portion (unnumbered) of a tire T.

The curing tube 12 is simply an annular tube which is normally flat and is preferably constructed from high-strength rubber which may, if desired, be suitably reinforced to withstand the high pressures associated with the operation of the apparatus 10, as will be described more fully hereinafter. The curing tube 12 includes a tubular stem 20 which functions to introduce high pressure liquid L into the interior of the curing tube 12 to expand the same in the manner illustrated best in FIG. 3, while an additional tubular stem 21 is provided to remove the liquid L from the tube interior.

Though the stems 20, 21 are illustrated for convenience as being adjacent one another, the precise positioning thereof may vary to achieve the most efficient circulation of the liquid L through the curing tube 12 which in turn assures a relatively constant temperature internally of the curing tube 12 and thus a constant and controllable temperature at the inner surface (unnumbered) of the tread portion. For example, the stem 20 could be positioned 180° removed from the stem 21 which would be at the bottom of the curing tube 12, as viewed in FIG. 1, whereby the liquid L would be introduced at the bottom and removed from the top of the curing tube 12 as viewed in this same figure. However, the latter positions may also be reversed which would augment the natural convection currents of the liquid L.

The back-up member 13 is preferably constructed from a single piece of high-strength metal and is supported internally of the tire T in any conventional manner. However, in accordance with this invention, it has been found that no support whatever is necessary for the back-up member 13 since it will self-center as the curing tube 12 expands. Thus, the back-up member 13 is relatively inexpensive to manufacture since from a machining standpoint only two bores 22, 23 are required to accommodate the stems 20, 21, respectively.

The closed liquid circuit 14 includes in addition to the curing tube 12 one or more hollow conduits or manifolds 24, 25 which are annular members suitably secured against the exterior surface of the circumferential wall 15 of the matrix 11. The conduits 24, 25 are placed in fluid communication with each other at the top of the matrix 11 by a T-coupling 26 while a like T-coupling 27 (FIG. 1) places the conduits 24, 25 in fluid communication at the bottom of the matrix 11. A flexible conduit 28 (FIG. 3) is removably connected by conventional couplings 30, 31 to the stem 21 and the T-coupling 26, respectively. A like flexible conduit 32 is secured at one end to the stem 20 by a conventional releasable coupling 33 while at its opposite end the conduit 32 is connected to a tank 34 or similar reservoir for the liquid L which includes as a part thereof a high-pressure pump of a conventional construction, as well as a conventional heater which may be, for example, a simple thermostatically controlled immersion heater located in the tank 34. An in-line pressure gauge 35 of a conventional construction is responsive to rapid depressurization which may occur due to leakage, bursting of the curing tube 12, etc., and upon such detection the operation of the pump is terminated. Assuming, for example, that the pump is conventionally operated from an electrical source, the output of the gauge 35 may manually, pneumatically or electrically open the pump circuit by a suitable signal, as indicated by the headed arrow 36, to thus de-energize the pump and preclude the liquid L from being undesirably expelled from the system 14, thus precluding attendant damage to the apparatus 10, personnel, etc.

In a like manner another flexible conduit 37 is connected between the output of the pump and the T-coupling 27, and the latter also includes an in-line pressure gauge 38 which functions identically to the gauge 35 to terminate the operation of the pump by an appropriate signal 40.

In operation the tire T is first buffed, the new tread rubber is applied, and the tire is inserted into the cavity 18 of the matrix 11 by spreading the tire beads (unnumbered) outwardly which is a common practice in so inserting tires in band-type molds or matrices. Thereafter, the curing tube 12 is inserted into the tire T with the stems 20, 21 projecting radially inwardly. Thereafter, the back-up member 13 is inserted into the tire T with the stems 20, 21 being inserted through the respective openings 22, 23. It is appreciated that with some tires it would be impossible to insert the back-up member 13 therein without damaging the tire T if the back-up member were constructed as a one-piece element, and thus the back-up member 13 may be constructed from two or more sections suitably hinged together and provided with means for locking the sections rigidly together to maintain the annular shape, in much the same manner as the matrix sections of FIG. 6 are hinged and locked together. Thereafter the conduit 28 which is already coupled to the T-coupling 26 is coupled to the stem 21 while the conduits 32, 37 are coupled to the stem 20 and the T-coupling 27, respectively.

The liquid L in the system 14 is a conventional noncompressible, nonexpandable and noncombustible liquid, such as oil, which is heated by a steamcoil, an electric immersion heater or the like to approximately 300° F., after which the pump is started to progressively inflate the curing tube 12 to a pressure above 200 psi., and as high as 600 psi., during which pressurization the liquid L continually circulates through the closed liquid circuit or system 14 in the manner indicated by the unnumbered headed arrows in FIG. 1. As is most readily apparent from FIG. 3, the construction of the apparatus 10 heats the tire T from the exterior side thereof by heat conducted through the circumferential wall 15 and the flanges 16, 17, while the tire is likewise heated from the interior by the curing tube 12. This construction along with the continuous circulation of the liquid L permits the temperature of the liquid to be regulated with accuracy in the absence of complicated and expensive controls. Moreover, since the liquid L is incompressible, it likewise does not expand at elevated temperatures and thus the pressure can be easily and accurately controlled and the resultant tread will be extremely dense which will substantially increase tread mileage.

The retread tire T is, of course, removed from the chamber 18 only after the pressure has been reduced and the curing tube 12 has been collapsed. Thereafter, the couplings 30, 33 are removed, along with the back-up member 13 and the curing tube 12 to remove the tire T, after which the operations heretofore described are repeated to recap or retread subsequent tires.

Reference is now made to FIG. 4 of the drawings which illustrates another apparatus 50 having components identical to those of the apparatus 10 bearing like reference numerals which are primed. However, as opposed to forming the matrix 51 as a solid ring, as in the apparatus 10, the matrix 51 is split at one point and opposed faces 52, 53 thereof are spaced appreciably to permit the tire T', the curing tube 12' and the back-up plate 13' to be inserted therein prior to closing the matrix 51 by the rotation of a left and right-hand threaded trunnion bolt 54 which is threaded into journal blocks 55, 56 pivoted between two pairs of spaced brackets 57, 58, respectively. Rotation of the trunnion bolt 54 in one direction will draw the faces 52, 53 toward each other while rotation in an opposite direction will spread the same. Due to this construction the apparatus 50 can be more rapidly operated, particularly in regard to the insertion and removal of the tire T' relative to the matrix 50.

The split construction of the matrix 51 also requires the conduits or manifolds 24', 25' to be likewise split and similarly end faces or walls 60, 61 are provided to close the chambers of the manifolds 24', 25'.

It is to be noted that this construction also permits the insertion of shims (not shown) or similar spacers between the end faces 52, 53 to accommodate the matrix 51 for variations in tolerance between tires of like size.

Figure 5:
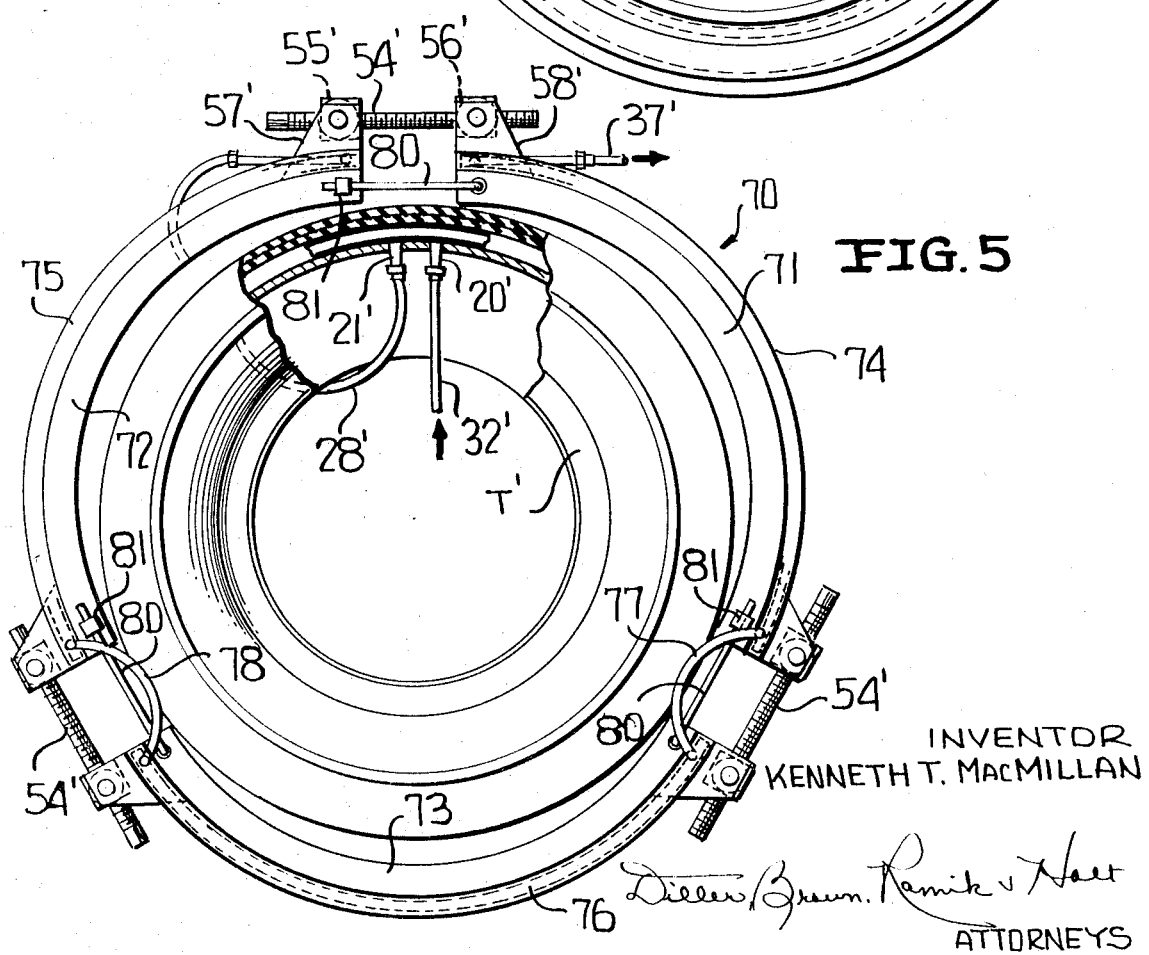
FIG. 5 is a side elevational view of another apparatus similar to the apparatus of FIG. 4, but illustrates a matrix being formed of three separate sections with adjacent pairs being united by left and right-hand threaded trunnion bolts.

Another apparatus 70 is shown in FIG. 5 and includes elements common to the apparatuses 10 and 50, which elements have been identically identified in FIG. 5. However, as opposed to either a solid or a split matrix, the apparatus 70 includes a matrix formed of three sections 71 through 73 with each section carrying on its exterior a pair of hollow heater conduits or manifolds 74 through 76, respectively. The manifolds 74, 76 are joined by a conduit 77 while the manifolds 75, 76 are joined by a conduit 78. The conduits 77, 78 are, of course, flexible and function to permit the continuous circulation of the liquid L through the manifold sections 74 through 76 upon the closing of the matrix sections 71 through 73 by rotating the trunnion bolts 54'.

Each of the mold sections 71 through 73 also includes a rod 80 pivotally secured thereto which is guided in a sleeve 81 welded or otherwise conventionally secured to the next adjacent mold or matrix section. The rods 80 and sleeves 81 function to guide the sections 71 through 73 toward each other during both the opening and closing operations of the apparatus 70.

Referring now to FIGS. 6 and 7, another apparatus 90 is illustrated which likewise includes elements common to the apparatuses 10, 50 and 70 which have been identified by like though primed reference numerals. However, though the matrix sections 71' through 73' are provided in much the same manner as the apparatus 70, appropriate lugs and bolts 91, 92 are provided to pivotally connect the matrix sections 71' and 72' to the matrix section 73'.

The apparatus 90 is also provided with a pair of side annular reinforcing plates or pressure plates 93, 94 provided with reinforcing webs 95. In the closed position the plates 93, 94 are in alignment with the flanges 17', 16', respectively, and function to prevent the tire side walls (unnumbered) from bulging or bellowing outwardly under the influence of high pressure liquid in an annular flexible curing tube or bladder 96 which corresponds generally to the curing tube 12 except that it is of a higher volumetric capacity and is of a generally oval cross section, as opposed to the one flat-sided construction of the curing tube 12. Accordingly, a back-up member 97 of the apparatus 90 includes a matingly contoured surface 98 to accommodate a portion of the curing tube 96, and stepped peripheral edges 101, 102 which carry peripheral seals 103, 104, respectively. The seals 103, 104 serve a dual purpose by first applying clamping forces to the tire side walls in conjunction with the pressure plates 93, 94, and also prevent leakage should the curing tube 96 leak or otherwise fail when under pressure.

While preferred forms and arrangements of parts have been shown in illustrating the invention, it is to be clearly understood that various changes in details and arrangement of parts may be made without departing from the scope and spirit of this disclosure.

I claim:

1. Apparatus for retreading tires comprising means defining a generally annular chamber adapted to receive at least the tread portion of the tire to be retreaded, means defining a generally annular back-up member in internal telescopic relationship to said chamber means, a generally annular flexible bladder in external telescopic relationship to said back-up member, means for introducing and removing liquid into and from said bladder, a source of noncompressible, nonexpandable, noncombustible liquid, a closed liquid circuit including said source and bladder, said closed liquid circuit further including a high pressure pump for pressurizing said liquid and circulating the same through said closed liquid circuit, and means for heating said liquid to a temperature appreciably above ambient whereby a tire in said chamber means is cured under the influence of the heated and pressurized liquid in said bladder.

2. The apparatus as defined in claim 1 wherein a portion of said closed liquid circuit defines means for heating said chamber means separate and apart from any indirect heating thereof from the heated liquid within said bladder.

3. The apparatus as defined in claim 1 wherein said chamber means is a generally annular matrix, said annular matrix includes conduit means, and said conduit means is a portion of said closed liquid circuit whereby heated liquid conducted therethrough will heat said matrix.

4. The apparatus as defined in claim 1 wherein said chamber means is a generally annular matrix, said annular matrix includes conduit means, said conduit means is a portion of said closed liquid circuit whereby heated liquid conducted therethrough will heat said matrix, and said conduit means is in external telescopic relationship to said matrix.

5. The apparatus as defined in claim 1 wherein said chamber means is a generally annular matrix, said annular matrix includes conduit means, said conduit means is a portion of said closed liquid circuit whereby heated liquid conducted therethrough will heat said matrix, and said conduit means is internally of said matrix.

6. The apparatus as defined in claim 1 wherein said introducing and removing means are a pair of tubular stems, and said closed liquid circuit includes first conduit means coupled to one of said stems for introducing liquid into said bladder from said pump and second conduit means coupled to the other of said stems for removing liquid from said bladder and returning the same to said source.

7. The apparatus as defined in claim 1 including means for automatically terminating the operation of said pump upon accidental depressurization of the closed liquid circuit.

8. The apparatus as defined in claim 1 including means defining a seal between said bladder and said back-up member to prevent leakage of liquid should said bladder leak and/or burst.

9. The apparatus as defined in claim 1 wherein said chamber means is a generally annular matrix, said annular matrix includes conduit means, said conduit means is a portion of said closed liquid circuit whereby heated liquid conducted therethrough will heat the matrix, and means for automatically terminating the operation of said pump upon accidental depressurization of the closed liquid circuit.

10. The apparatus as defined in claim 3 wherein said introducing and removing means are a pair of tubular stems, and said closed liquid circuit includes first conduit means coupled to one of said stems for introducing liquid into said bladder from said pump and second conduit means coupled to the other of said stems for removing liquid from said bladder and returning the same to said source.

11. The apparatus as defined in claim 9 wherein said introducing and removing means are a pair of tubular stems, and said closed liquid circuit includes first conduit means coupled to one of said stems for introducing liquid into said bladder from said pump and second conduit means coupled to the other of said stems for removing liquid from said bladder and returning the same to said source.

12. A method of retreading tires comprising the steps of inserting at least a portion of a tire into a generally annular chamber, positioning an annular back-up member in internal telescopic relationship to the tire, positioning an annular flexible bladder in the tire and in external telescopic relationship to the back-up member, heating a noncompressible, nonexpandable, noncombustible liquid above ambient temperature, and circulating the heated liquid through the bladder under high pressure whereby the bladder is expanded to force the tire into intimate contact with the annular chamber and effecting the curing thereof through the heated liquid.

13. The method of retreading tires as defined in claim 12 wherein the pressure of the liquid is between substantially 200–600 psi.

14. The method of retreading tires as defined in claim 12 wherein the temperature of the liquid is approximately 300° F.

15. The method of retreading tires as defined in claim 13 wherein the temperature of the liquid is approximately 300° F.

16. Apparatus for retreading tires comprising means defining a generally annular chamber adapted to receive at least a portion of a tire, an annular back-up member in internal telescopic relationship to said annular chamber and a tire adapted to be received therein, an annular flexible bladder in external telescopic relationship to the back-up member, means for heating a noncompressible, nonexpandable, noncombustible liquid above ambient temperature, and means for circulating the heated liquid through the bladder under high pressure whereby the bladder is expanded to force a tire into intimate contact with the annular chamber and effect the curing thereof through the heated liquid.

17. The method of retreading tires as defined in claim 12 including the step of circulating the liquid into, through and out of the bladder, and the annular bladder defines a portion of a closed loop liquid circulation system.

18. The method of retreading tires as defined in claim 12 including the step of circulating the liquid into, through and out of the bladder, circulating the liquid in an annular passage exteriorly surrounding the tire whereby conduction currents heat the tire from the exterior inwardly, and circulating the liquid between the annular passage and the annular bladder.

19. The method of retreading tires as defined in claim 17 wherein the pressure of the liquid is between substantially 200–600 psi, and the temperature of the liquid is approximately 300° F.

20. The method of retreading tires as defined in claim 18 wherein the pressure of the liquid is between substantially 200–600 psi, and the temperature of the liquid is approximately 300° F.

21. The method of retreading tires as defined in claim 20 including the step of circulating the liquid in an annular passage exteriorly surrounding the tire whereby conduction currents heat the tire from the exterior inwardly, and circulating the liquid between the annular passage and the annular bladder.

* * * * *